United States Patent
Barnett et al.

(10) Patent No.: US 9,555,497 B2
(45) Date of Patent: Jan. 31, 2017

(54) TRANSLATIONAL TORCH HEIGHT CONTROLLER FOR A PLASMA ARC TORCH

(71) Applicant: Thermal Dynamics Corporation, West Lebanon, NH (US)

(72) Inventors: Daniel Wayne Barnett, Plainfield, NH (US); Christopher V. Braudis, Sr., Canaan, NH (US); Nakhleh Hussary, Grantham, NH (US); Dirk Ott, Canaan, NH (US)

(73) Assignee: Victor Equipment Company, Chesterfield, MO (US)

( * ) Notice: Subject to any disclaimer, the term of this patent is extended or adjusted under 35 U.S.C. 154(b) by 526 days.

(21) Appl. No.: 13/648,969

(22) Filed: Oct. 10, 2012

(65) Prior Publication Data

US 2013/0087537 A1    Apr. 11, 2013

Related U.S. Application Data

(60) Provisional application No. 61/545,561, filed on Oct. 10, 2011.

(51) Int. Cl.
| | | |
|---|---|---|
| *B23K 9/00* | (2006.01) | |
| *B23K 10/00* | (2006.01) | |
| *B23K 7/10* | (2006.01) | |
| *B23K 37/02* | (2006.01) | |
| *H05H 1/34* | (2006.01) | |

(52) U.S. Cl.
CPC ............. *B23K 10/006* (2013.01); *B23K 7/102* (2013.01); *B23K 37/0241* (2013.01); *H05H 1/34* (2013.01); *H05H 2001/3457* (2013.01)

(58) Field of Classification Search
CPC ... B23K 10/006; B23K 37/0241; B23K 7/102; B23K 10/00; H05H 1/34; H05H 2001/3457; H05H 1/26
USPC ......... 219/121.37, 121.39, 121.45, 121.48,219/121.54, 121.56, 121.58, 124.1, 124.31,219/124.34, 130.4; 901/42
See application file for complete search history.

(56) References Cited

U.S. PATENT DOCUMENTS

| | | | |
|---|---|---|---|
| 4,052,040 A | | 10/1977 | Ogden |
| 4,514,616 A | * | 4/1985 | Warner .................... 219/136 |
| 4,645,901 A | * | 2/1987 | Scholz et al. ............. 219/125.1 |
| 4,681,202 A | * | 7/1987 | Dinse ........................ 192/129 A |
| 4,724,302 A | * | 2/1988 | Penney et al. ........... 219/130.21 |
| 4,854,551 A | | 8/1989 | Griebeler |
| 4,954,005 A | * | 9/1990 | Knasel et al. ................. 403/57 |
| 4,998,606 A | * | 3/1991 | McCormick et al. ..... 192/56.32 |
| 5,468,929 A | * | 11/1995 | Brolund et al. ......... 219/121.56 |
| 5,550,344 A | * | 8/1996 | Winterfeldt .......... B23K 10/006 219/121.39 |
| 5,866,872 A | * | 2/1999 | Lu et al. .................. 219/121.56 |

(Continued)

FOREIGN PATENT DOCUMENTS

WO    WO 2013055816 A1    4/2013

OTHER PUBLICATIONS

International Search Report dated Jan. 17, 2013 issued in PCT/US2012/059587.

*Primary Examiner* — Dana Ross
*Assistant Examiner* — Joseph Iskra

(57) ABSTRACT

A plasma arc torch is provided that includes a torch body and a torch height controller. The torch height controller includes a movable part mounted to the torch body and a fixed part connected to a robotic arm. The movable part and the torch body are biased toward a workpiece and are translational relative to the fixed part.

16 Claims, 13 Drawing Sheets

(56) References Cited

U.S. PATENT DOCUMENTS

| | | | |
|---|---|---|---|
| 6,346,751 B1 * | 2/2002 | Delfino et al. | 307/326 |
| 2002/0117484 A1 * | 8/2002 | Jones | B23K 10/006 |
| | | | 219/121.57 |
| 2002/0125220 A1 | 9/2002 | Augeraud et al. | |
| 2004/0175227 A1 * | 9/2004 | Munch et al. | 403/287 |
| 2010/0140240 A1 * | 6/2010 | Turner | 219/124.4 |
| 2010/0200554 A1 * | 8/2010 | Uchida et al. | 219/137 R |
| 2010/0243619 A1 * | 9/2010 | Currier et al. | 219/121.48 |

* cited by examiner

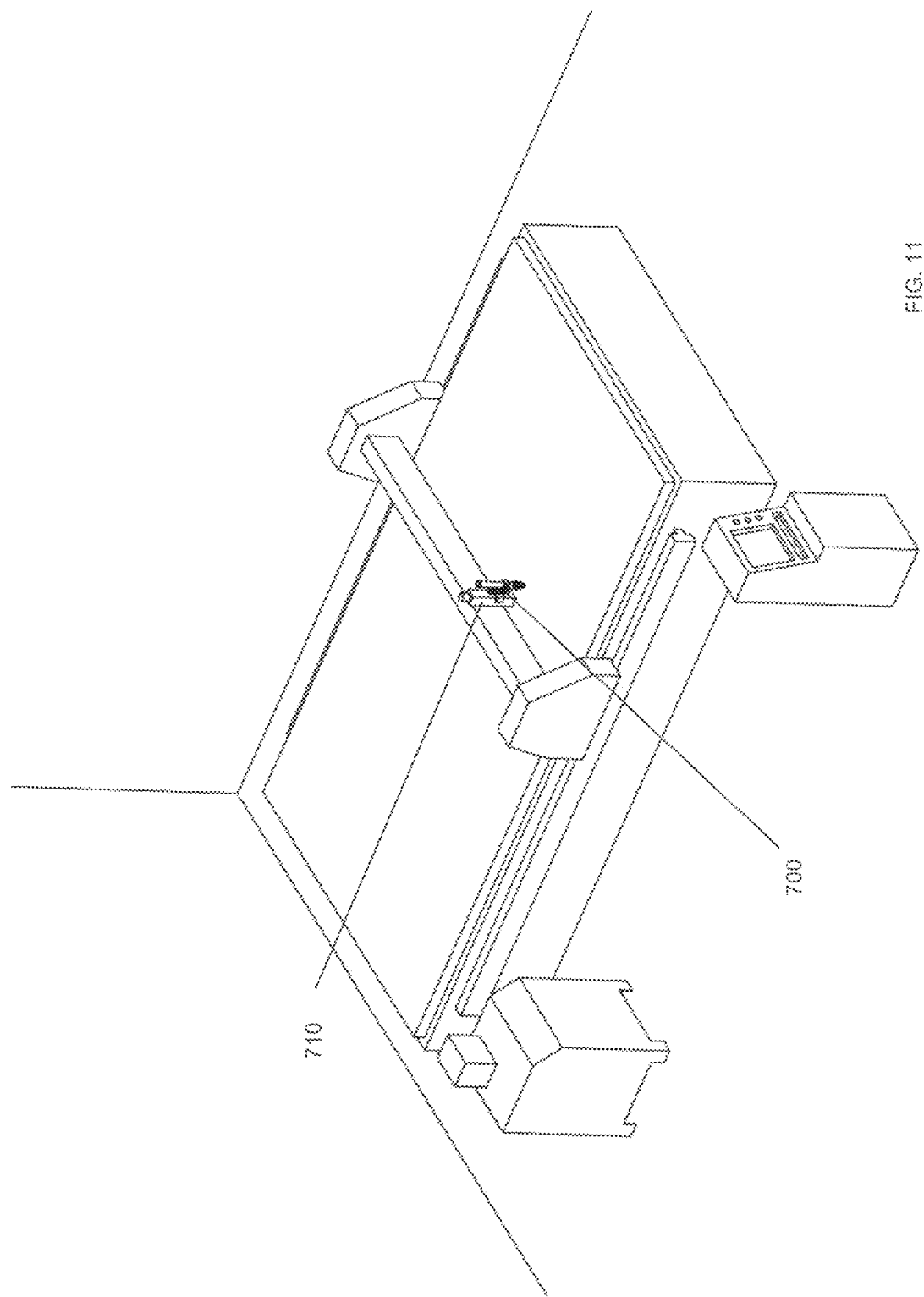

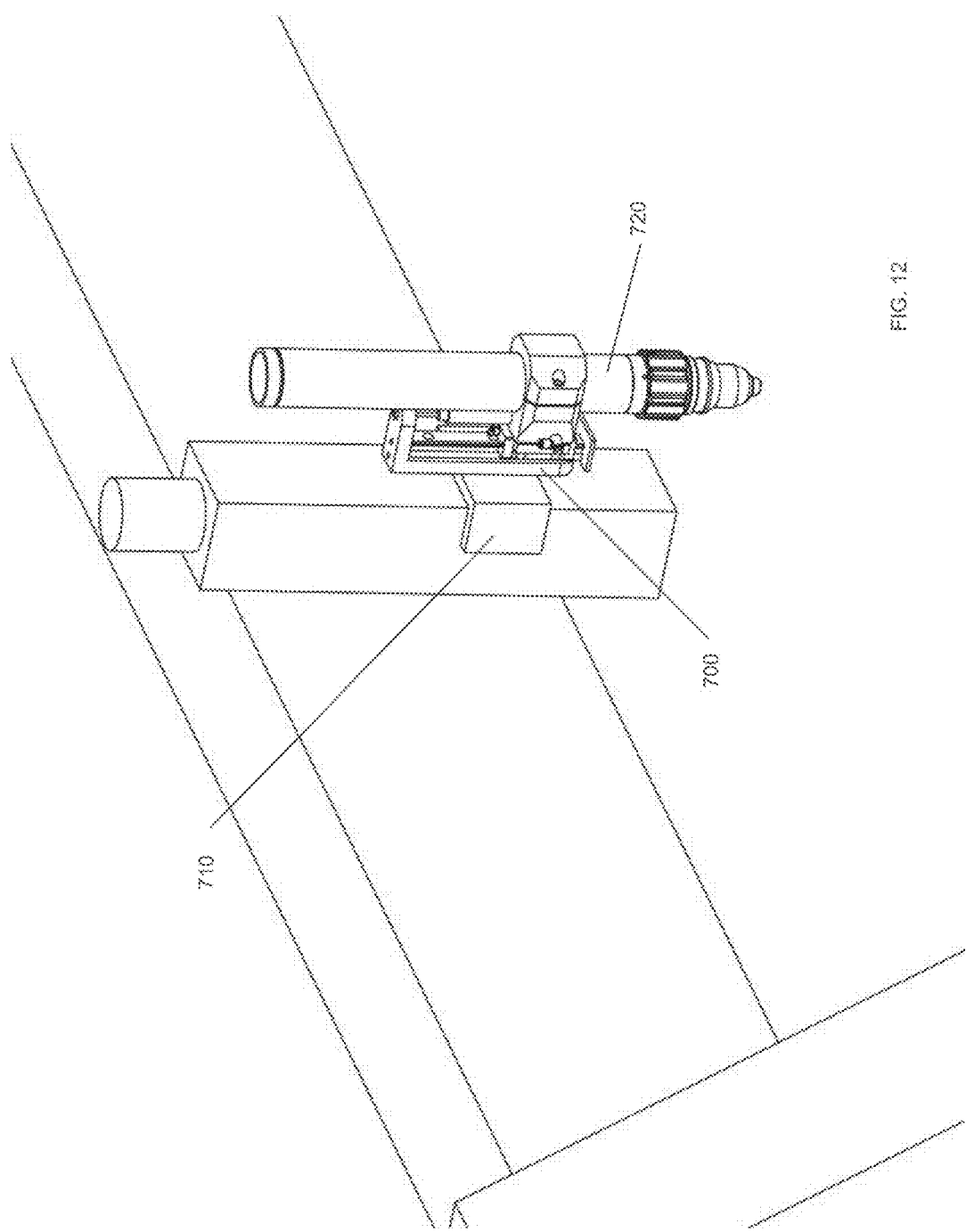

TRANSLATIONAL TORCH HEIGHT CONTROLLER FOR A PLASMA ARC TORCH

CROSS-REFERENCE TO RELATED APPLICATIONS

This application claims the benefit of provisional application Ser. No. 61/545,561, titled "Plasma Arc Torch With Improved Drag Cutting," filed on Oct. 10, 2011, the contents of which are incorporated herein by reference in their entirety.

FIELD

The present disclosure relates to plasma arc torches and more specifically to automated plasma arc torches with improved torch height control.

BACKGROUND

The statements in this section merely provide background information related to the present disclosure and may not constitute prior art.

Plasma arc torches, also known as electric arc torches, are commonly used for cutting, marking, gouging, and welding metal workpieces by directing a high energy plasma stream consisting of ionized gas particles toward the workpiece. In a typical plasma arc torch, the gas to be ionized is supplied to a distal end of the torch and flows past an electrode before exiting through an orifice in the tip, or nozzle, of the plasma arc torch. The electrode has a relatively negative potential and operates as a cathode. Conversely, the torch tip constitutes a relatively positive potential and operates as an anode during piloting. Further, the electrode is in a spaced relationship with the tip, thereby creating a gap, at the distal end of the torch. In operation, a pilot arc is created in the gap between the electrode and the tip, often referred to as the plasma arc chamber, wherein the pilot arc heats and ionizes the gas. The ionized gas is blown out of the torch and appears as a plasma stream that extends distally off the tip. As the distal end of the torch is moved to a position close to the workpiece, the arc jumps or transfers from the torch tip to the workpiece with the aid of a switching circuit activated by the power supply. Accordingly, the workpiece serves as the anode, and the plasma arc torch is operated in a "transferred arc" mode.

The plasma arc torch is generally maintained at a predetermined torch height during operation for optimum cut quality. For manual operation, a welder can adjust the torch height based on the arc voltage between the torch tip and the workpiece even for cutting a workpiece with varied height or thickness. For automated plasma arc torches controlled by robots, however, the torch height control becomes difficult or slow based on the arc voltage. Therefore, the robot-controlled plasma arc torches are generally pre-programmed with a fixed torch height. As such, the robot-controlled plasma arc torches can be used to cut limited types of workpieces, such as small workpieces which are more dimensionally stable during cutting or thicker workpieces which are less sensitive to height variations of the workpiece. The robot-controlled plasma arc troches are not suitable for cutting workpieces with height variations.

Moreover, using robotic-controlled plasma arc torches to cut large thin materials poses another challenge in that the large thin materials may have a dimensional tolerance that is greater than the torch height (in the range of 0.020 to 0.150 inches). In other words, the height variations in the workpiece may be greater than the torch height. The large thin materials may have deformed due to heat or residual stress generated during prior operations such as stamping. Without the ability to adjust the torch height during operation, the automated plasma arc torches would not achieve optimum cut quality or may be damaged by the workpiece.

SUMMARY

In one form of the present disclosure, a plasma arc torch is provided that includes a torch body, and a torch height controller. The torch height controller includes a movable part mounted to the torch body and a fixed part connected to a robotic arm. The movable part and the torch body are biased toward a workpiece and are translational relative to the fixed part.

In another form, a plasma arc torch is provided that comprises a torch body, a conventional torch height controller, and a translational torch height controller including a movable part mounted to the torch body and a fixed part connected to the conventional torch height controller. The movable part and the torch body are biased towards a workpiece and are translational relative to the fixed part during drag cutting operations.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 11 is a perspective view of another form of the torch height controller mounted to a conventional torch height controller and constructed in accordance with the teachings of the present disclosure; and FIG. 12 is an enlarged view of the torch height controller of FIG. 11.

DETAILED DESCRIPTION

Figure 1:
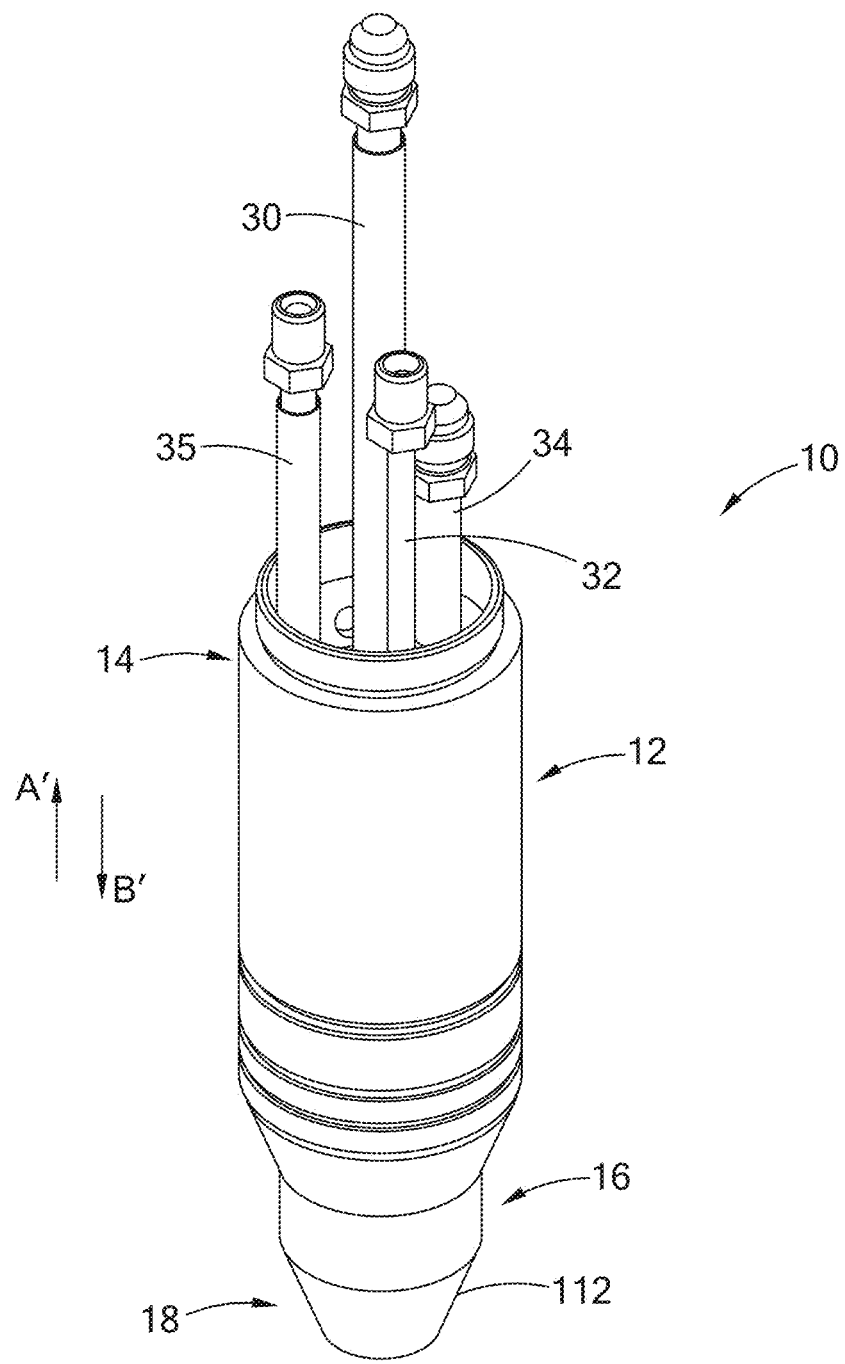
FIG. 1 is a perspective view of a plasma arc torch in accordance with the principles of the present disclosure.

The following description is merely exemplary in nature and is not intended to limit the present disclosure, application, or uses. It should be understood that throughout the drawings, corresponding reference numerals indicate like or corresponding parts and features. It should also be understood that various cross-hatching patterns used in the drawings are not intended to limit the specific materials that may be employed with the present disclosure. The cross-hatching patterns are merely exemplary of preferable materials or are used to distinguish between adjacent or mating components illustrated within the drawings for purposes of clarity.

Figure 2:
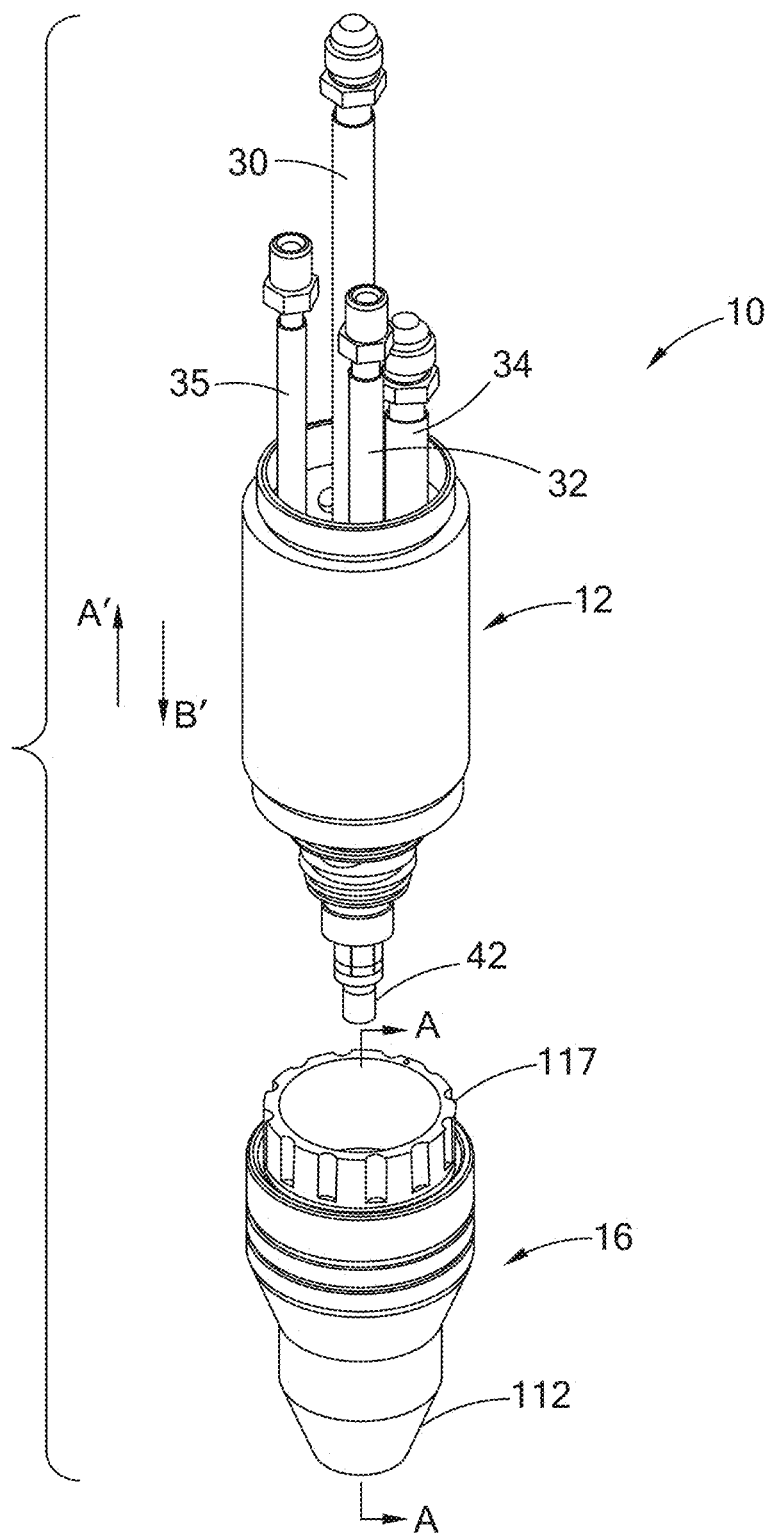
FIG. 2 is an exploded perspective view of a plasma arc torch in accordance with the principles of the present disclosure.

Referring to FIGS. 1 and 2, a plasma arc torch in accordance with the principles of the present disclosure is illustrated and indicated by reference numeral 10. The plasma arc torch 10 generally includes a torch head 12 disposed at a proximal end 14 of the plasma arc torch 10 and a consumable cartridge 16 secured to the torch head 12 and disposed at a distal end 18 of the plasma arc torch 10 as shown. The torch head 12 and the consumable cartridge 16 are collectively referred to as a torch body. Proximal direction or proximally is the direction towards the torch head 12 from the consumable cartridge 16 as depicted by arrow A', and distal direction or distally is the direction towards the consumable cartridge 16 from the torch head 12 as depicted by arrow B'. The plasma arc torch 10 may be automated and controlled by a robotic arm (not shown).

The torch head 12 is adjoined with a coolant supply tube 30, a plasma gas tube 32, a coolant return tube 34, and a secondary gas tube 35, wherein plasma gas and secondary gas are supplied to and cooling fluid is supplied to and returned from the plasma arc torch 10 during operation. A torch lead (not shown) is mounted to the proximal end of the torch head 12. A coolant tube 42 in fluid communication with the coolant supply tube 30 extends distally from the torch head 12 and is inserted into the consumable cartridge 16, which will be described in more detail below. The consumable cartridge 16 includes a locking ring 117 (shown in FIG. 2) around the proximal end portion of the consumable cartridge 16 and a drag cap 112 disposed at the distal end portion of the consumable cartridge 16. The locking ring 117 secures the consumable cartridge 16 to the torch head 12. The drag cap 112 contacts a workpiece (shown in FIG. 3) during operation to maintain a predetermined torch height. The structure of the torch head 12 has been described in U.S. Pat. No. 7,145,098, titled "Plasma Arc Torch" and issued Dec. 5, 2006, which is commonly assigned with the present application and the disclosure of which is incorporated herein by reference in its entirety.

Figure 3:
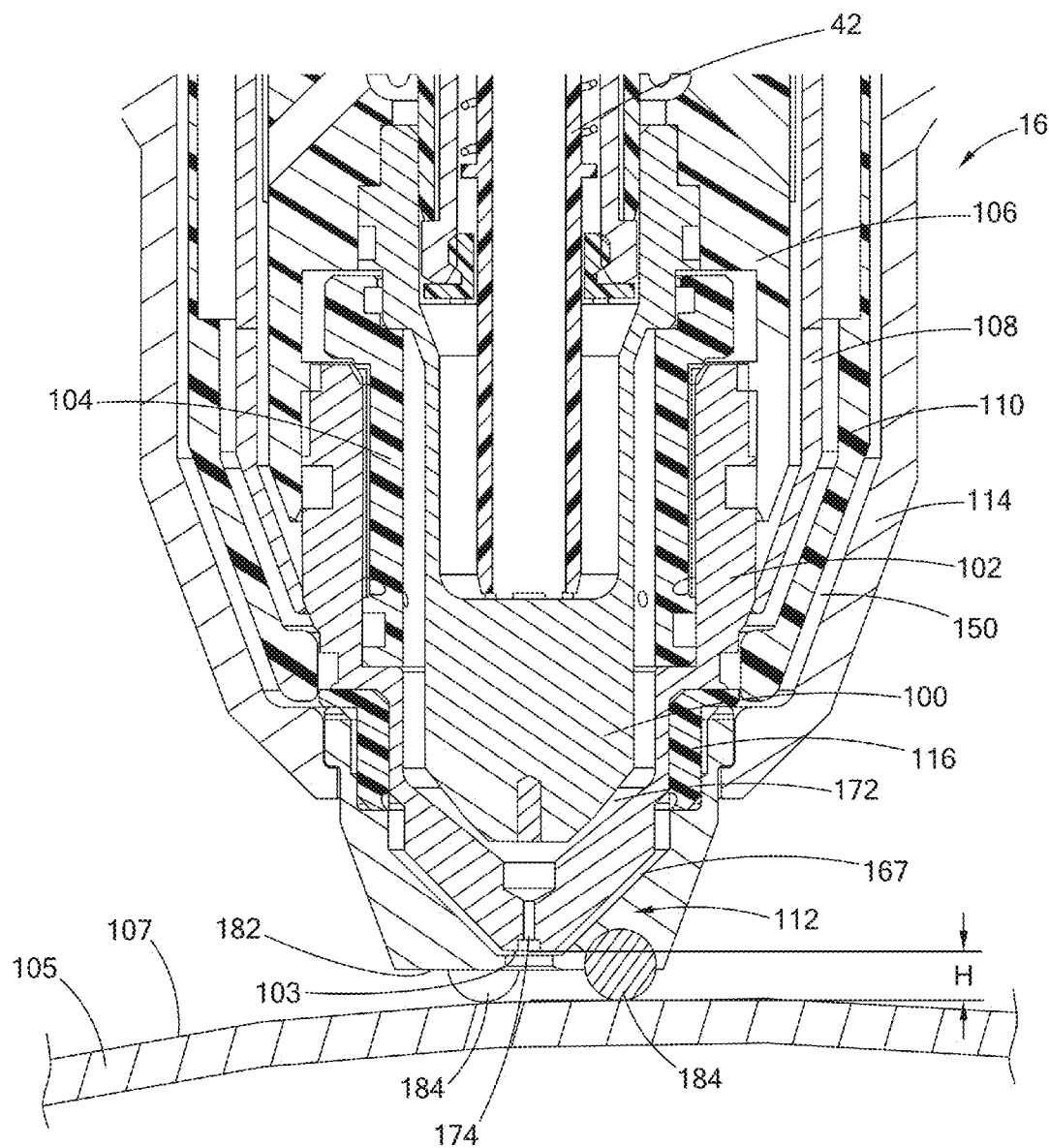
FIG. 3 is a partial longitudinal cross-sectional view of a cartridge body, taken along line A-A of FIG. 2.

Referring to FIG. 3, the consumable cartridge 16 includes a plurality of consumables, including but not limited to, an electrode 100, a tip 102, a spacer 104 disposed between the electrode 100 and the tip 102, a cartridge body 106, an anode member 108, a baffle 110, the drag cap 112, a shield cap 114, and an insulator 116. The coolant tube 42 of the torch head 12 is inserted into the electrode 100 and guides the coolant gas flowing from the coolant supply tube 30 into the interior of the electrode 100. The anode member 108 is secured to the cartridge body 106 and connects an anode body (not shown) in the torch head 20 to the tip 102 to provide electrical continuity from the power supply (not shown) to the tip 102. The spacer 104 provides electrical separation between the cathodic electrode 100 and the anodic tip 102, and further provides certain gas distributing functions. The shield cap 114 surrounds the baffle 110, wherein a secondary gas passage 150 is formed therebetween. The insulator 116 is disposed between the tip 102 and the drag cap 112 to provide electrical separation between the tip 102 and the drag cap 112.

The tip 102 is electrically separated from the electrode 100 by the spacer 104, which results in a plasma chamber 172 being formed between the electrode 100 and the tip 102. The tip 102 further comprises a central orifice (or an exit orifice) 174, through which a plasma stream exits during operation of the plasma arc torch 10 as the plasma gas is ionized within the plasma chamber 172. The plasma gas enters the tip 102 through the gas passageway 173 of the spacer 104. The tip 102 defines a distal end surface 103.

The drag cap 112 is mounted around the tip 112 and the spacer 104 and defines a secondary gas chamber 167 between the drag cap 112 and the tip 112. The secondary gas chamber 167 allows a secondary gas to flow through to cool the tip 102 during operation. The drag cap 112 includes a plurality of balls 184 at a distal end face 182 of the drag cap 112. The plurality of balls 184 contact a cutting surface 107 of a workpiece 105 to maintain a torch height H measured from the cutting surface 107 of the workpiece 105 to the distal end face 103 of the tip 102.

Figure 4:
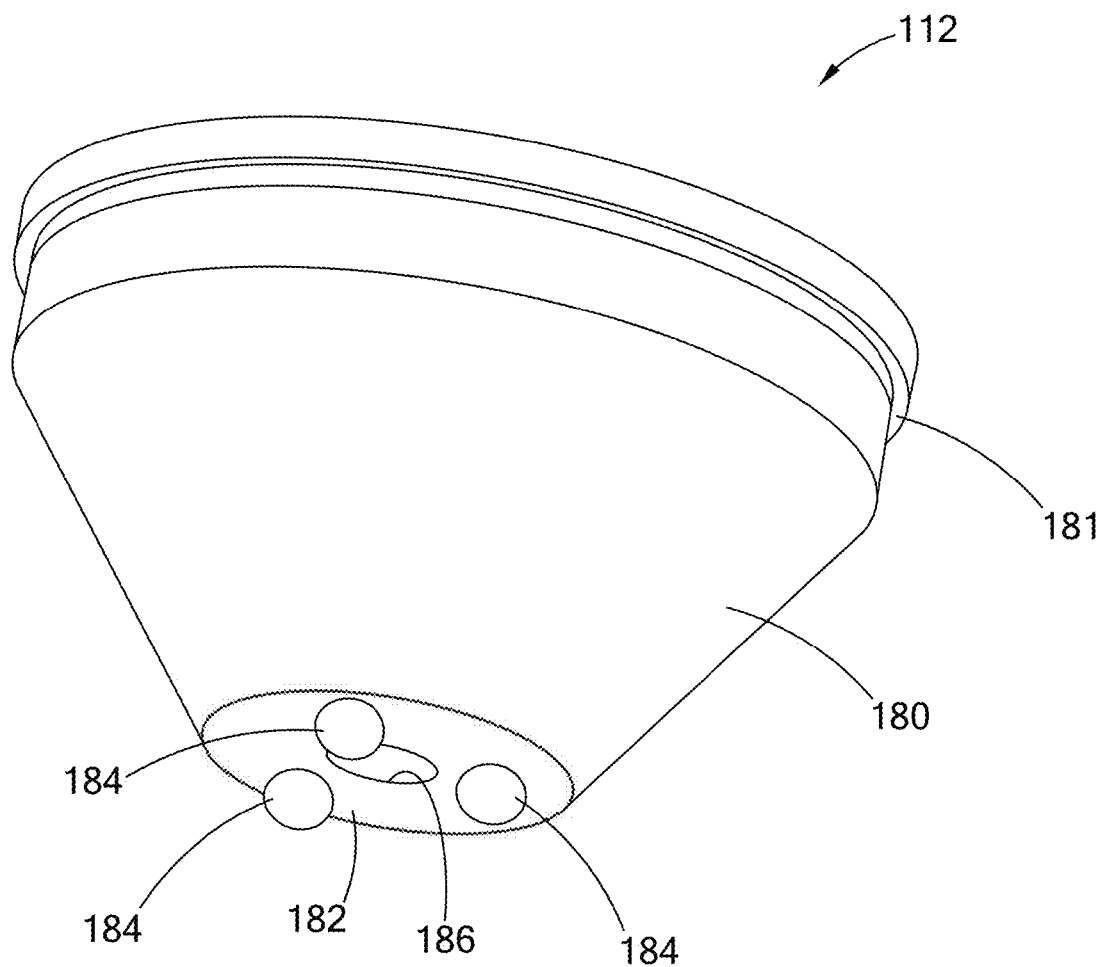
FIG. 4 is a perspective view of a drag cap of a plasma arc torch in accordance with the principles of the present disclosure.
Figure 5:
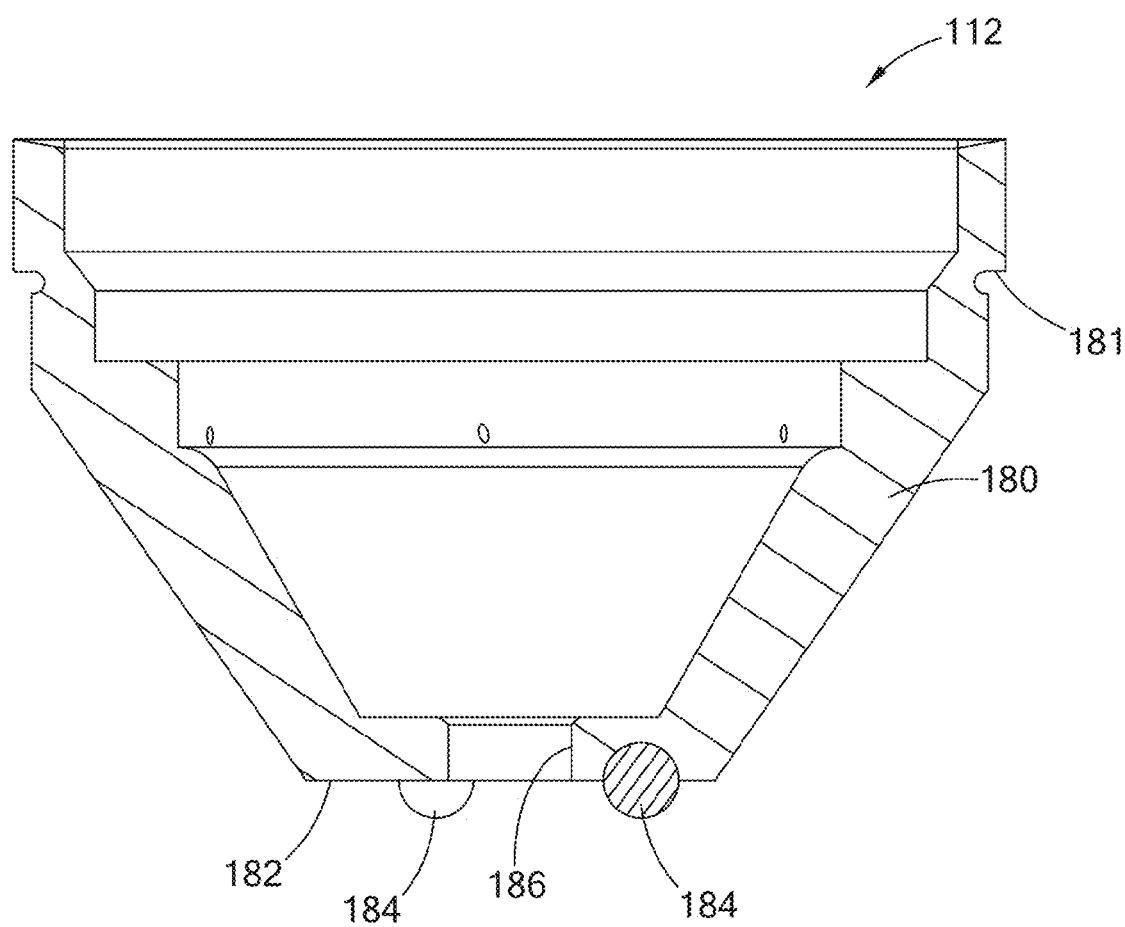
FIG. 5 is a cross-sectional view of a drag cap of a plasma arc torch in accordance with the principles of the present disclosure.

Referring to FIGS. 4 and 5, the drag cap 112 includes a hollow cone body 180 defining a shoulder 181 for engaging the shield cap 114. The hollow cone body 180 includes the distal end face 182. The plurality of balls 184 are pressed-in or brazed into the distal end face 182 of the drag cap 112 with protruding portions protruding from the distal end face 182. The plurality of balls 184 allow a robotic arm (not shown) attached to the torch head 12 to smoothly drag the plasma arc torch 10 along the cutting surface 117 of the workpiece 115 during cutting, marking or gouging operations. While three balls 184 are shown in the figure, it is understood that any number of balls may be provided. The balls 184 may be designed to be optimized for specific gases flowing through the plasma arc torch 10, materials and thickness of the workpiece. For example, the balls 184 may be made from a material with sufficient hardness (at least 30 HRC) to reduce the amount of wear caused by repetitive dragging. A suitable material of the balls 184 is steel. In yet another form, the balls are made from a material which has a high melting temperature to reduce the possibility of molten metal from damaging the surface of the balls during cutting. Additionally, the balls in another form are made from a material that is an electrical insulator to prevent arcing on the balls. In yet another form, the material of the balls are dissimilar from the material which they are sliding against during cutting to prevent galling between the two surfaces. Ceramics, for example Si3N4, meet the above mentioned requirements and have been found to outperform steel balls. During testing, marking of the cut part was visible when using steel balls, but not with Si3N4 ceramic balls. The Si3N4 ceramic balls showed significantly less damage than the steel balls after use. An exit orifice 186 extends through the distal end face 182 and is aligned with the exit orifice 174 of the tip 102.

Figure 6A:
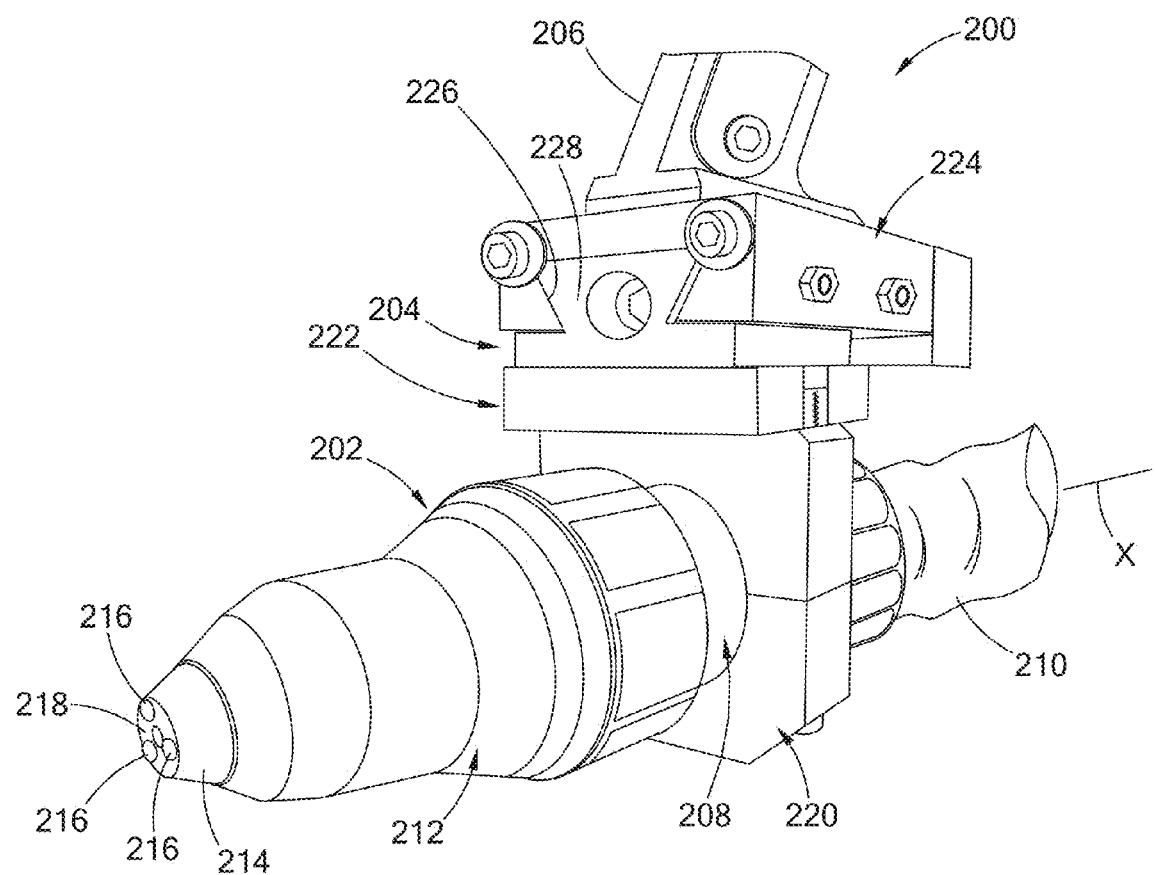
FIG. 6A is a perspective view of a plasma arc torch assembly including a torch height controller in accordance with a first embodiment of the present disclosure.
Figure 6B:
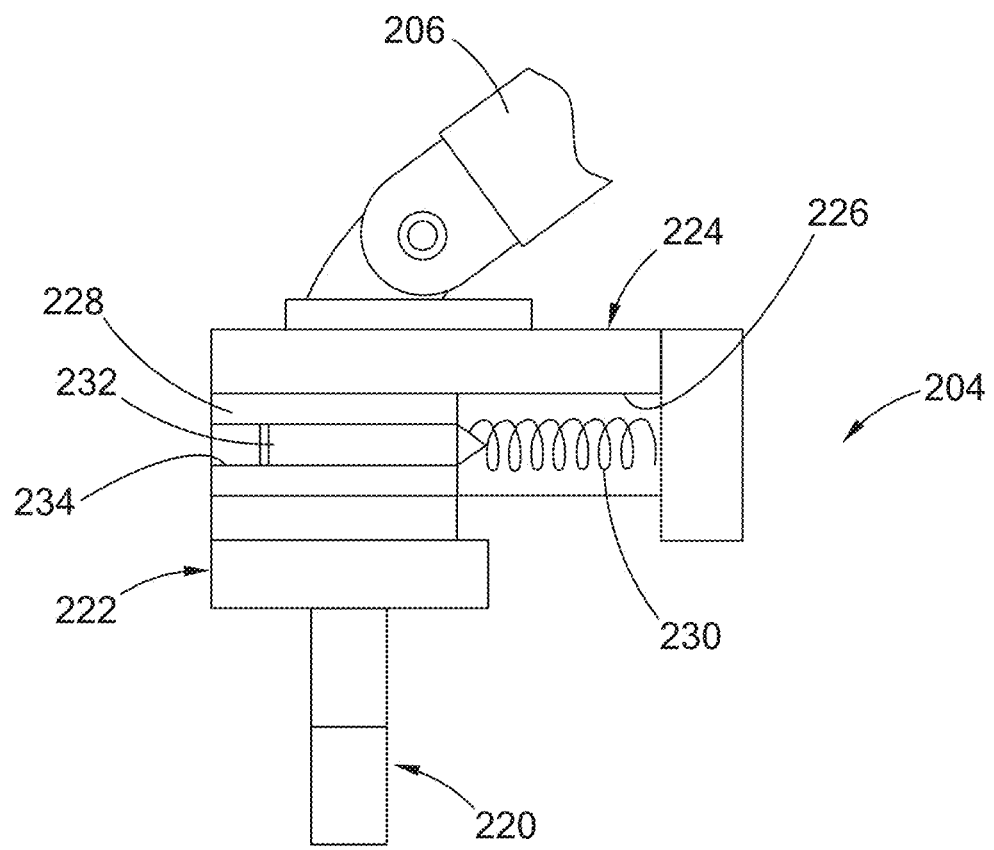
FIG. 6B is a side view of the torch height controller of FIG. 6A.

Referring to FIGS. 6A and 6B, a plasma arc torch assembly 200 in accordance with a first embodiment of the present disclosure includes a plasma arc torch 202 and a torch height controller 204 removably mounted to the plasma arc torch 202 and configured to engage a robotic arm 206. The plasma arc torch 202 includes a torch body 208 and a torch lead 210.

The torch height controller 204 connects the torch body 208 of the plasma arc torch 202 to the robotic arm 206 and adjusts the torch height of the plasma arc torch 202 during robotic-controlled cutting. The torch height controller 204 allows for translational movement of the plasma arc torch 202 along a longitudinal direction X of the plasma arc torch 202 relative to the robotic arm 206.

More specifically, the plasma arc torch 202 includes a consumable cartridge 212 having a structure similar to that of FIG. 3 and including a drag cap 214, and a plurality of balls 216 protruding from a distal end face 218 of the drag cap 214.

The torch height controller 204 in accordance with the first embodiment of the present disclosure includes a torch holder 220 surrounding the plasma arc torch 202, a movable part 222 fixedly coupled to the torch holder 220, and a fixed part 224 fixedly coupled to the robotic arm 206. The fixed part 224 defines a slot 226. The movable part 222 includes an insertion block 228 mating with the slot 226 and slidably received in the slot 226. While the slot 226 and the insertion block 228 are shown to have a substantially V or triangular shape, the slot 226 and the insertion block 228 may have different shapes and configurations without departing from the scope of the present disclosure. For example, the slot 226 and the insertion block 228 may have a rectangular shape, circular shape as long as the insertion block 228 can be slidably retained within the slot 226.

As clearly shown in FIG. 6B, the torch height controller 204 further includes a compression spring 230, such as a mechanical spring or a gas spring, installed within the slot 226 for biasing the insertion block 228 in a distal direction so that the insertion block 228 is spring-loaded. When the plasma arc torch 202 is disposed over the workpiece 105 with the balls 216 of the drag cap 214 contacting the cutting surface 107 of the workpiece 105, the biasing force applied to the insertion block 228 and consequently the movable part 222 is transmitted to the torch holder 220 and the plasma arc torch 202. Therefore, the plasma arc torch 202 is biased against the cutting surface 107 of the workpiece 105. The contact between the plasma arc torch 202 and the workpiece 105 is maintained by biasing the plasma arc torch 202 toward the workpiece 105 with a biasing force. The preload or the biasing force is adjustable via a set screw 232 provided in a screw hole 234 of the insertion block 228. The set screw 232 is aligned with the compression spring 230. While a compression spring 230 is shown in the drawings, other types of compression springs may be used, including but not limited to a leaf spring, a plate spring and a gas spring.

The constant low force is maintained to ensure that the drag cap 214 remains in contact with the workpiece 105 during operation. The balls 216 in the drag cap 214 facilitate smooth drag along the cutting surface 107 of the workpiece 105 during operation. For example, when the plasma arc torch 202 is moved to a part of the workpiece 105 that is slightly recessed (e.g., having a reduced height or thickness) from the cutting surface 107 of the workpiece 105 and thus the distance between the cutting surface 107 and the distal end face of the tip is increased, the compression spring 230 may push the plasma arc torch 202 distally against the workpiece 105 so that the predetermined torch height H is maintained. When the plasma arc torch 202 is moved to a part of the workpiece 105 that is slightly raised (e.g., having an increased height or thickness), the raised part of the workpiece 105 may apply a reaction force to the torch body 208 and the movable part 222 to overcome the biasing force of the compression spring 230, thereby moving the insertion block 228 proximally relative to the slot 226. The predetermined torch height H is thus maintained despite the uneven cutting surface 107 of the workpiece 105 without changing the height position of the robotic arm 206. Preferably, a short stroke of less than 1 inch of travel is provided to limit the mass of the assembly and its moment of inertia.

Figure 7:
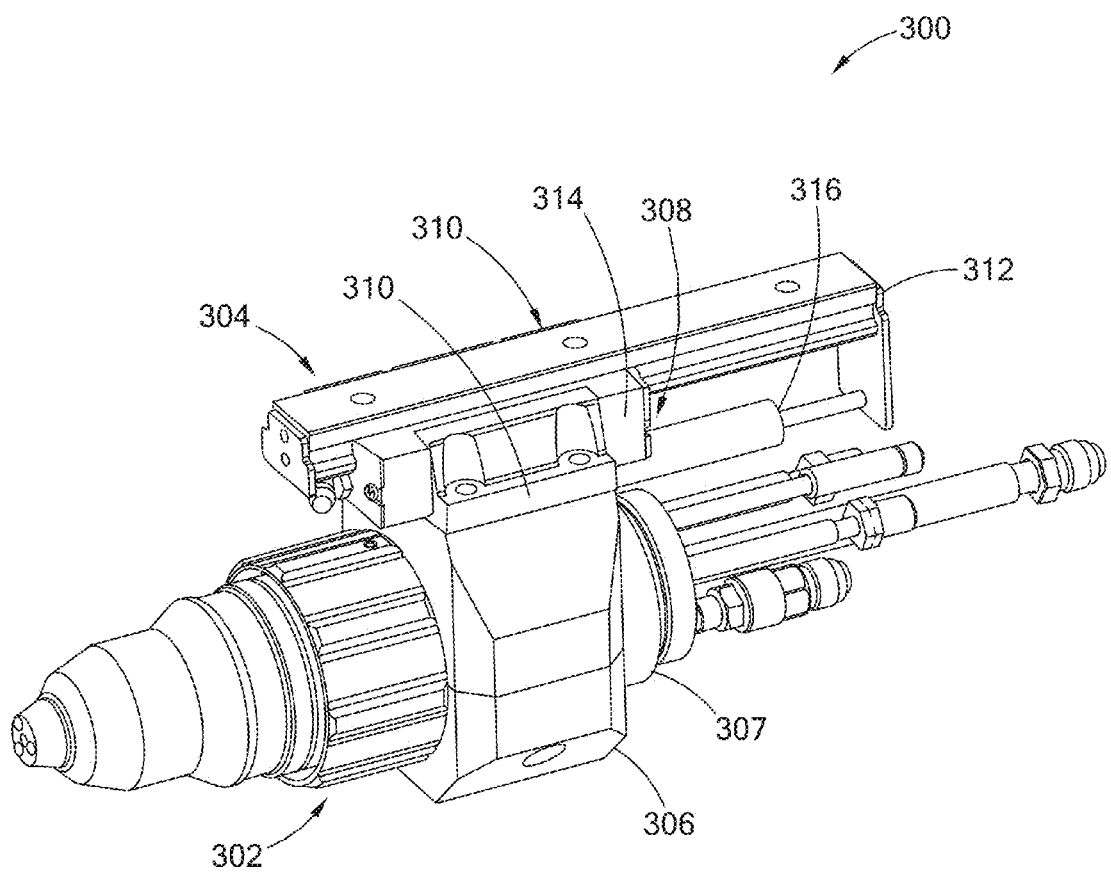
FIG. 7 is a perspective view of a plasma arc torch assembly including a torch height controller in accordance with a second embodiment of the present disclosure.

Referring to FIG. 7, a plasma arc torch assembly 300 in accordance with a second embodiment of the present disclosure includes a plasma arc torch 302 and a torch height controller 304 removably mounted to the plasma arc torch 302 for connecting the plasma arc torch 302 to a robotic arm (not shown). The torch height controller 304 includes a torch holder 306 surrounding a torch body 307 of the plasma arc torch 302, a movable part 308, and a fixed part 310 proximate the robotic arm (not shown).

The fixed part 310 includes a guide rail 312. The movable part 308 includes a mounting member 310 fixedly coupled to the torch holder 306 and a sliding block 314 slidably received in the guide rail 312. A compression coil spring 316 engages the sliding block 314 to provide a biasing force on the sliding block 314, which in turn biases the plasma arc torch 302 against the workpiece 105 to maintain a predetermined torch height. The torch height can be adjusted and maintained to the predetermined torch height by biasing the sliding block 314 against the compression coil spring 316.

Figure 8:
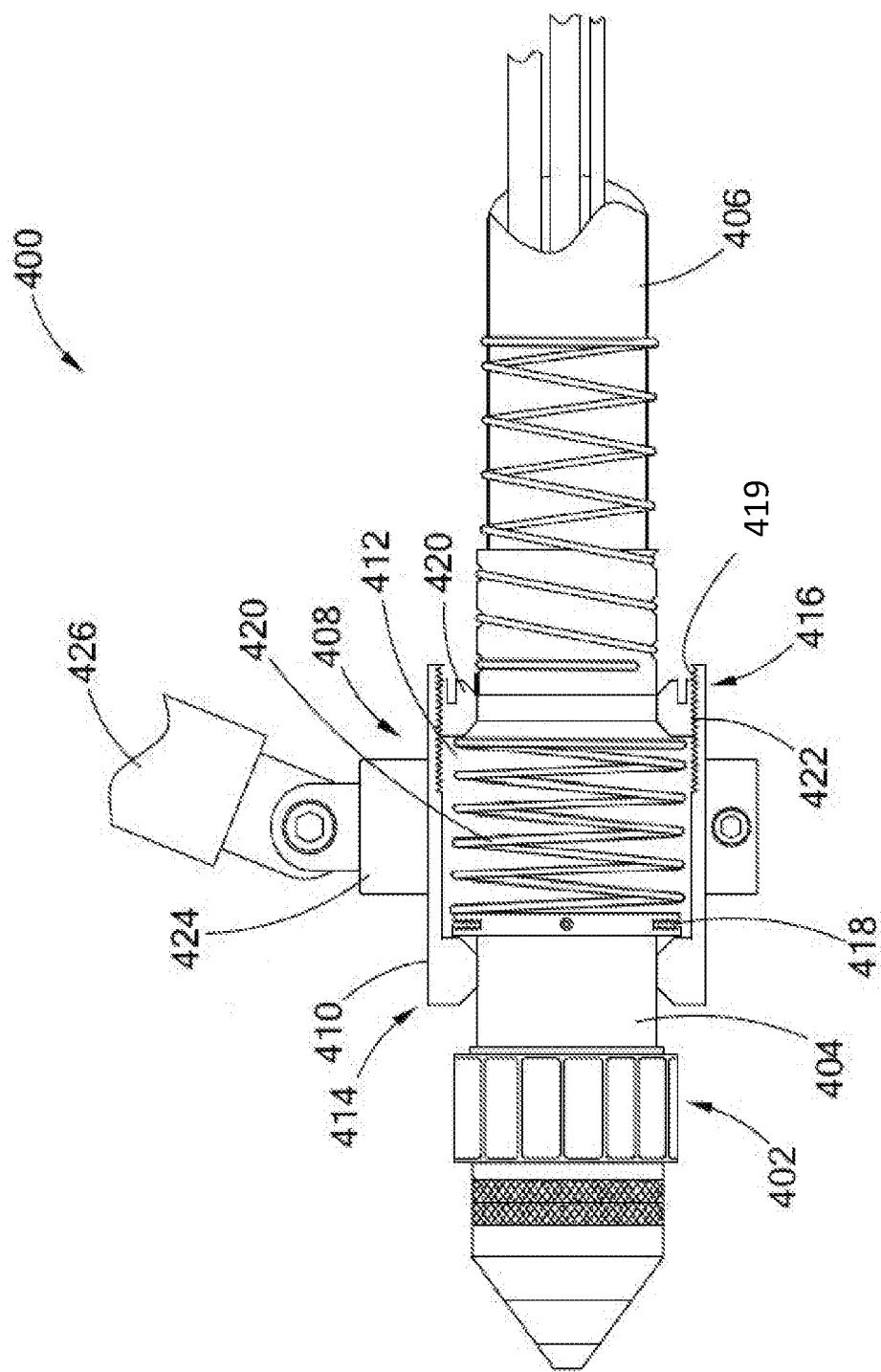
FIG. 8 is a perspective view of a plasma arc torch assembly including a torch height controller in accordance with a third embodiment of the present disclosure.

Referring to FIG. 8, a plasma arc torch assembly 400 in accordance with a third embodiment of the present disclosure includes a plasma arc torch 402 and a torch height controller 404 mounted around the plasma arc torch 402. The plasma arc torch 402 includes a torch body 404 and a torch lead 406. The torch height controller 404 includes a torch holder 408 including a cylindrical housing 410 surrounding the torch body 404. A receiving space 412 is defined between the torch body 404 and the cylindrical housing 410. The cylindrical housing 410 has a distal end 414 and a proximal end 416. A movable part 418 is fixedly coupled to the torch body 404 and disposed within the receiving space 412 and proximate the distal end 414. The proximal end 416 of the cylindrical housing 410 has a teethed inner surface 419. A retaining flange 420 is disposed between the proximal end 416 of the cylindrical housing 410 and the torch body 404 and defines a teethed outer surface 422 for engaging the teethed inner surface 419. A compression coil spring 420 is disposed in the receiving space 412 and between the movable part 418 and the retaining flange 420.

A robot arm connecting member 424 is disposed on the cylindrical housing 410 for connecting to the torch holder 408 to a robotic arm 426. The torch holder 408 is mounted around the torch body 404 in a way such that the plasma arc torch 402 is free to rotate within the cylindrical housing 410 to change the rotational position of the plasma arc torch 402 relative to the robotic arm 426. This configuration prevents the torch lead 406 from twisting.

During operation, the compression coil spring 420 may be further compressed in the proximal direction by the movable part 418 when the plasma arc torch 402 is moved to a raised portion of the workpiece 105. The workpiece 105 applies a reaction force to the torch body 404 to move the torch body 404 distally. The movable part 418, which is fixedly coupled to the torch body 404, overcomes the biasing force of the compression coil spring 420 and pushes the compression coil spring 420. As a result, the torch height is maintained despite the changed height of the workpiece 105. The biasing force of the compression coil spring 420 may be adjusted by changing the position of the retaining flange 420 relative to the cylindrical housing 410. The position of the retaining flange 420 relative to the cylindrical housing 410 is maintained through the engagement between the inner teethed surface 418 and the teethed outer surface 422.

Figure 9:
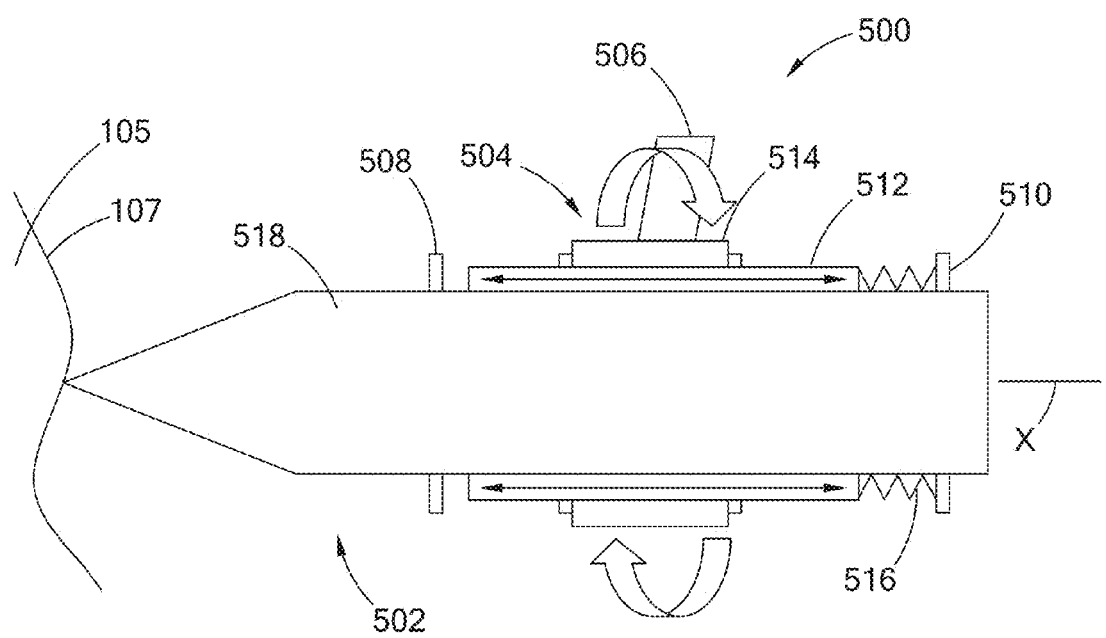
FIG. 9 is a perspective view of a plasma arc torch assembly including a torch height controller in accordance with a fourth embodiment of the present disclosure.

Referring to FIG. 9, a plasma arc torch assembly 500 in accordance with a fourth embodiment of the present disclosure includes a plasma arc torch 502 and a torch height controller 504 connecting the plasma arc torch 502 to a robotic arm 506. The torch height controller 504 has a dual bearing or bushing design for both rotational and translational movement of the plasma arc torch 502 relative to the robotic arm 506.

More specifically, the torch height controller 504 includes a distal flange 508, a proximal flange 510, an inner bearing 512, an outer bearing 514, and a compression spring 516. The distal flange 508 and the proximal flange 510 are fixedly coupled to the torch body 518. The inner bearing 512 is mounted around the torch body 518 of the plasma arc torch 502 and the outer bearing 514 is mounted around the inner bearing 512. The inner bearing 512 allows for translational movement of the plasma arc torch 502 relative to the inner bearing 512 along a longitudinal axis X of the plasma arc torch 502 and does not allow rotation of the plasma arc torch 502 relative to the inner bearing 512. The outer bearing 514 allows rotation of the inner bearing 512 relative to the outer bearing 514 and does not allow for translational movement of the inner bearing 512 relative to the outer bearing 514. The compression spring 516 is disposed between the inner bearing 512 and the proximal flange 510 to bias the inner bearing 512 and consequently the plasma arc torch 502 toward the cutting surface 107 of the workpiece 105. The distal flange 508 functions as a stop to limit the translational movement of the plasma arc torch 502.

Figure 10:
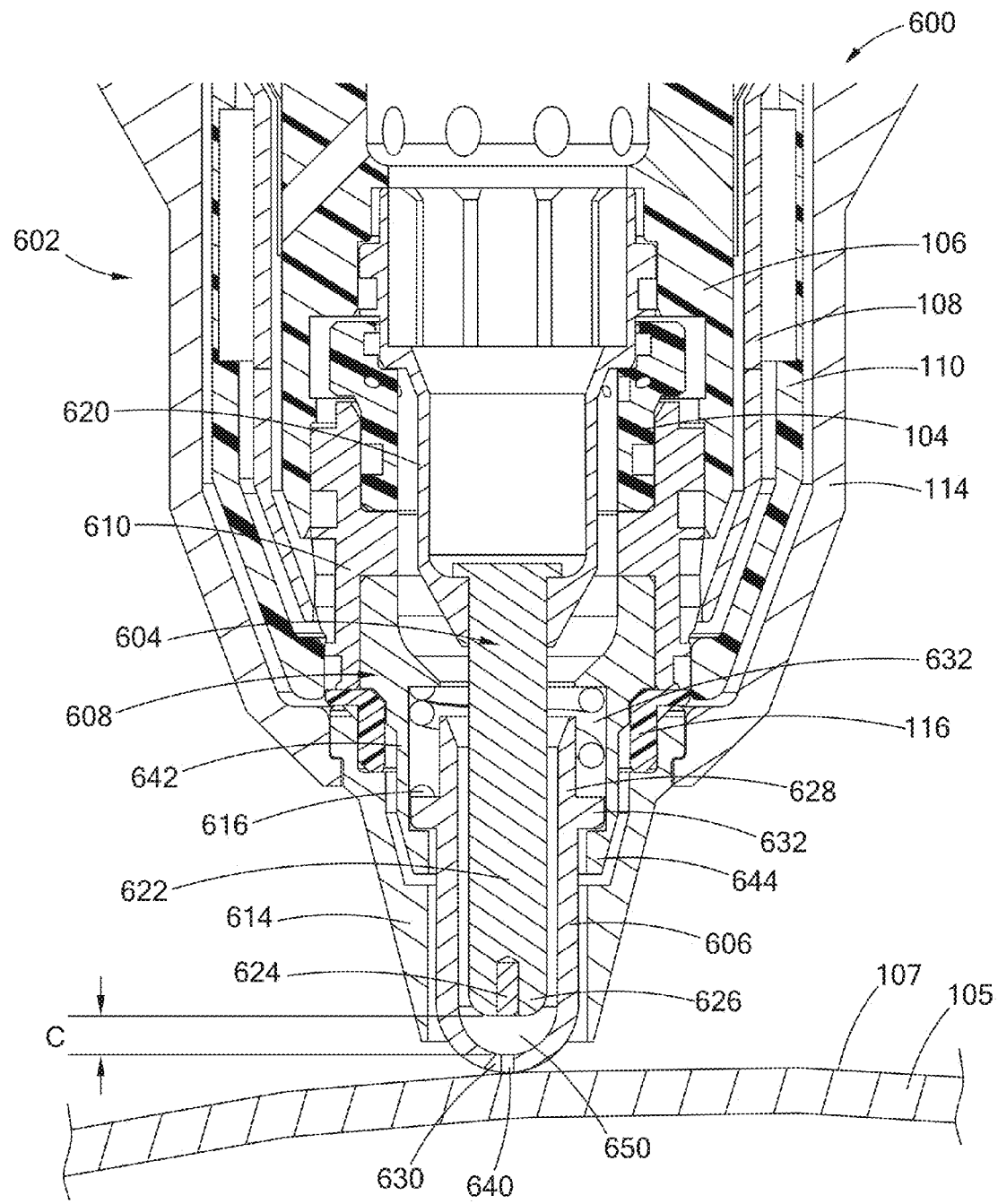
FIG. 10 is a cross-sectional view of a plasma arc torch in accordance with the principles of the present disclosure.

Referring to FIG. 10, a plasma arc torch 600 in accordance with a fifth embodiment of the present disclosure includes a torch head (not shown) having a structure similar to the torch head 12 of FIGS. 1 and 2, and a consumable cartridge 602 mounted to the torch head. The consumable cartridge 602 has a structure similar to the consumable cartridge 16 of FIG. 3 except for the structure inside the cartridge body 106.

More specifically, the consumable cartridge 602 includes a cartridge body 106, a spacer 104 received within the cartridge body 106, an anode member 108 secured to the cartridge body 106, a baffle 110 surrounding the anode member 108, and a shield cap 114 surrounding the baffle 110. The spacer 104, the cartridge body 106, the anode member 108, the baffle 110 and the shield cap 114 are similar to those described in connection with FIG. 3 and the description thereof is omitted herein for clarify. The consumable cartridge 602 further includes an electrode 604, a tip 606, a tip support housing 608 for movably supporting the tip 606 therein, an intermediate housing 610 disposed between the spacer 104 and the tip support housing 608, a secondary shield cap 614, a coil spring 616, and an insulator 116.

The electrode 604 includes a hollow housing portion 620 disposed inside the cartridge body 106 and an elongated portion 622 extending distally from the hollow housing portion 620. An emissive insert 624 is disposed at a distal end 626 of the elongated portion 622.

The tip 606 includes a proximal portion 628 and a distal portion 630. An annular flange 632 is disposed proximate the proximal portion 628. A spring receiving space 632 is defined by the tip support housing 608, the proximal portion 628 and the annular flange 630 of the tip 606. The distal portion 630 has a rounded shape to facilitate dragging contact with the surface 107 of the workpiece 105. An exit orifice 640 is formed in the distal portion 630 of the tip 606. The tip 606 is separated from the electrode 608. The distal end face of the electrode 608 and the rounded portion 630 of the tip 606 have a clearance C and define a plasma chamber 650 therebetween.

The tip support housing 612 includes a distal cylindrical portion 642 for receiving the proximal portion 628 of the tip 606. A stop 644 is disposed inside the tip support housing 612 to limit the translational movement of the tip 606 in the distal direction. The coil spring 616 is received within the spring receiving space 632 to bias the tip 606 against the cutting surface 107 of the workpiece 105. The insulator 116 is disposed between the tip support housing 608 and the secondary cap 614 to provide electrical insulation therebetween.

In the present embodiment, the tip 606, not the secondary cap 614 is in contact with the workpiece 107 during operation. The distance between the distal end face of the electrode 604 and the exit orifice 640 of the tip 606 can be varied by the coil spring 616. The tip 606 is spring-loaded and can have translation movement along a longitudinal direction of the plasma arc torch 600 to adjust the distance between distal end face of the electrode 604 and the exit orifice 640 of the tip 606.

While only the tip 606 is shown to be spring-loaded, it is understood and appreciated that the electrode 604, the spacer 104 and the secondary cap 614 can be configured to be spring-loaded to maintain the tip-to-electrode clearances within the plasma chamber 650.

Referring now to FIGS. 11 and 12, a translational torch height controller 700 (which includes the various forms of the present disclosure as set forth above) is shown incorporated with a conventional torch height controller 710. In this form, the conventional torch height controller 710 is used for cutting thicker workpieces, and the translational torch height controller 700 according to the present disclosure is used for drag cutting thinner workpieces. When in the configuration for cutting thicker workpieces, the movable part of the translational torch height controller is fixed and is not moved while the conventional torch height controller 710 controls the position of the plasma arc torch 720.

The drag cutting configuration provides good cut quality by ensuring that the torch height is accurate and consistent. Additionally, torch height control using arc voltage is not accurate during plasma cutting of thin gauge metals (<16 gauge), and the arc voltage can vary independently of the torch height because the arc does not always attach to the same location on the workpiece. In some cases, the arc will attach to the top surface of the metal, and in other cases, it will stretch below the surface of the metal and attach to the bottom of the workpiece. More specifically, relatively fast cutting of thin metals will cause the arc to attach to the top of the workpiece, and relatively slow cutting will cause the arc to attach to the bottom of the workpiece and often the optimal cutting speed is between these two settings. By providing both a translational torch height controller and a conventional torch height controller, both thick and thin workpieces can be cut using the same plasma arc cutting equipment setup while providing good cut quality for both thin and thick workpieces.

Accordingly, the translational torch height controllers according to the present disclosure may be connected to a conventional torch height controller, a robotic arm, or another adjacent component while remaining within the scope of the present disclosure.

The description of the invention is merely exemplary in nature and, thus, variations that do not depart from the substance of the disclosure are intended to be within the scope of the invention. Such variations are not to be regarded as a departure from the spirit and scope of the invention.

What is claimed is:

1. An apparatus comprising:
   a torch body of a plasma arc torch, the torch body containing one or more supply tubes; and
   a torch height controller including:
      a torch holder including a cylindrical housing surrounding an exterior circumference of the torch body;
      a receiving space defined between the torch body and the cylindrical housing;
      a moveable part oriented substantially perpendicular to the torch body and fixedly coupled directly to a distal most end surface of the torch body of the plasma arc torch and disposed within the receiving space; and
      a compression spring disposed within the receiving space between distal and proximal ends of the cylindrical housing, the compression spring directly coupled to the movable part.

2. The apparatus according to claim 1, wherein when the torch body is moved to a raised portion of a workpiece, the raised portion causes the moveable part to overcome a biasing force of the compression spring to move proximally to maintain the predetermined torch height.

3. The apparatus according to claim 1, further comprising a coil spring between the cylindrical housing and the torch body.

4. The apparatus according to claim 3, wherein the torch body is rotatable relative to the cylindrical housing.

5. The apparatus according to claim 3, wherein the coil spring biases the torch body along a longitudinal direction of the torch body.

6. The apparatus according to claim 1, wherein the torch height controller includes a first bearing to allow for translational movement of the torch body and a second bearing to allow for rotational movement of the torch body.

7. The apparatus according to claim 6, wherein the first bearing is mounted around the torch body and the second bearing is mounted around the first bearing.

8. The apparatus according to claim 1, further comprising a flange disposed between the proximal end of the cylindrical housing and the torch body.

9. The apparatus according to claim 1, wherein the torch body is rotatable within the cylindrical housing.

10. An apparatus comprising:
    a plasma arc torch including:
       a torch body housing one or more supply tubes;
       a torch height controller including:
          a torch holder including a cylindrical housing surrounding an exterior circumference of the torch body;
          a receiving space defined between the torch body and the cylindrical housing;
          a moveable part oriented substantially perpendicular to the torch body and fixedly coupled directly to a distal most end surface of the torch body of the plasma arc torch and disposed within the receiving space; and
          a compression spring disposed within the receiving space between distal and proximal ends of the cylindrical housing, the compression spring directly coupled to the movable part; and
    a robot arm connecting member disposed on the cylindrical housing for connecting the torch holder to a robotic arm, wherein the torch holder is mounted around the torch body to allow the plasma arc torch to rotate within the cylindrical housing to change a rotational position of the plasma arc torch relative to the robotic arm.

11. A translational torch height controller comprising:
    a torch holder including a cylindrical housing surrounding an exterior circumference of a torch body, the torch body housing one or more supply tubes;
    a receiving space defined between the torch body and the cylindrical housing;
    a moveable part oriented substantially perpendicular to the torch body and fixedly coupled directly to a distal most end surface of the torch body and disposed within the receiving space; and
    a compression spring disposed within the receiving space between distal and proximal ends of the cylindrical housing, and between the cylindrical housing and the torch body, the compression spring directly coupled to the movable part.

12. The apparatus according to claim 10, wherein when the plasma arc torch is moved to a raised portion of a workpiece, the raised portion causes the moveable part to overcome a biasing force of the compression spring to move proximally to maintain a predetermined torch height.

13. The apparatus according to claim 10, further comprising a retaining flange disposed between the proximal end of the cylindrical housing and the torch body and defining a teethed outer surface for engaging a teethed inner surface of the cylindrical housing, wherein the compression spring is in direct contact with the retaining flange.

14. The apparatus according to claim 13, the compression spring disposed within the receiving space between the movable part and the retaining flange.

15. The apparatus according to claim 10, wherein the torch body is rotatable about an axis extending longitudinally through a center of the torch body, the torch body rotatable relative to the cylindrical housing.

16. The apparatus of claim 15, further comprising a torch lead extending from the torch body, wherein the torch body rotates relative to cylindrical housing, and wherein the torch lead does not rotate when the torch body rotates.

* * * * *